April 23, 1957 — E. L. RICHARDSON — 2,789,656
ELECTROSTATIC PRECIPITATORS
Filed June 30, 1954 — 2 Sheets-Sheet 1
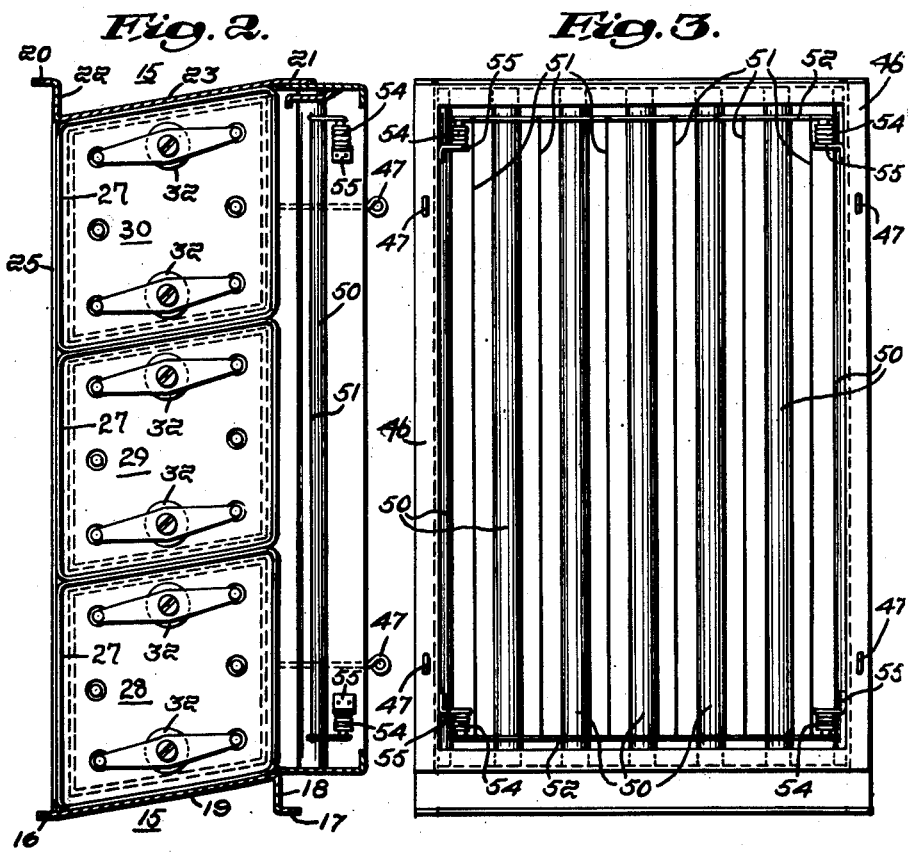
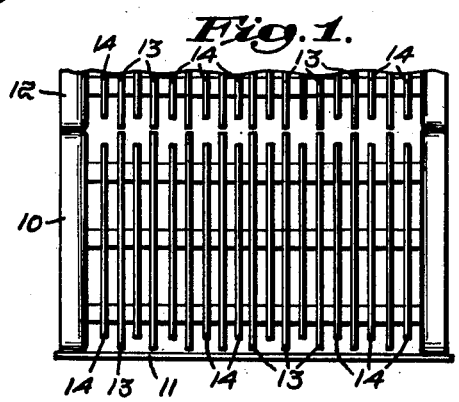
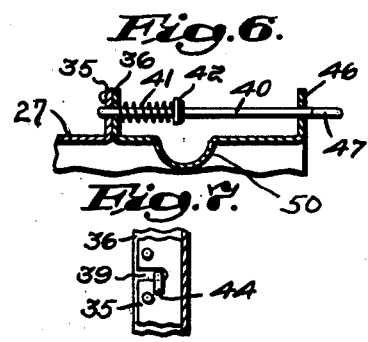
Inventor:
Earl L. Richardson,
by Robert T. Palmer
Attorney April 23, 1957 E. L. RICHARDSON 2,789,656
ELECTROSTATIC PRECIPITATORS
Filed June 30, 1954 2 Sheets-Sheet 2
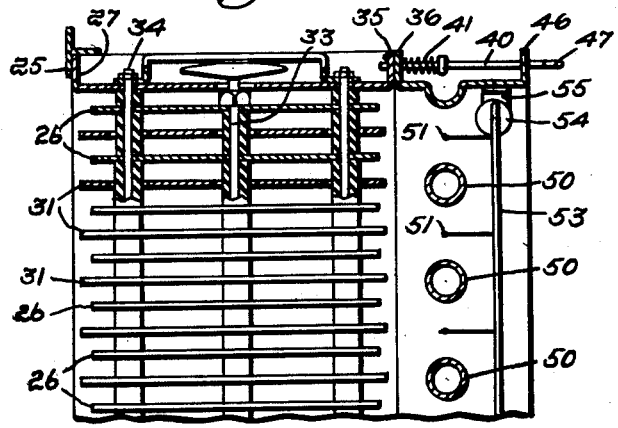
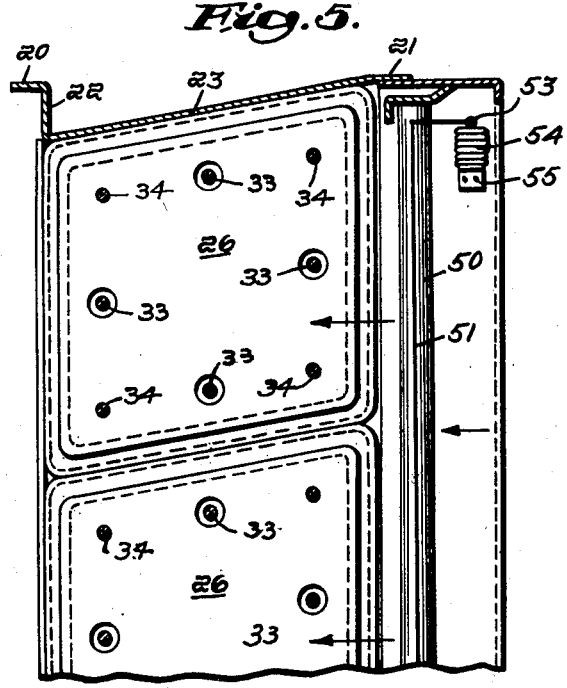
Inventor:
Earl L. Richardson,
by Robert J. Palmer
Attorney

United States Patent Office 2,789,656
Patented Apr. 23, 1957

2,789,656

ELECTROSTATIC PRECIPITATORS

Earl L. Richardson, Hyde Park, Mass., assignor to Westinghouse Electric Corporation, East Pittsburgh, Pa., a corporation of Pennsylvania Application June 30, 1954, Serial No. 440,463

9 Claims. (Cl. 183—7)

This invention relates to electrostatic precipitators for removing small foreign particles such as dust from gases such as air.

In electrostatic precipitators of the type having separate ionizers and collectors, it is common to provide the collectors in the form of self-contained cells which can be stacked in vertical and horizontal rows for providing a wide range of capacities. Such cells usually have rectangular collector plates supported from rectangular end walls. One form of such a cell is disclosed in my Patent No. 2,535,696.

Such cells can be stacked in vertical rows simply by stacking one cell upon another, thus eliminating the expense and weight of supporting shelves. One disadvantage of this method of stacking is that there is a loss in collection efficiency due to the gas to be cleaned passing between the cells where their corresponding collector plates are spaced apart. Such by-passing also occurs between the bottom cell and the bottom or bed plate of the precipitator, and between the top cell and the top of the precipitator.

This invention prevents such by-passing by providing collector cells with diamond shaped collector plates and end walls and by arranging the upper and lower walls of the precipitator in which the cells are used at angles to the horizontal. The gas flowing horizontally through the precipitator cannot pass between cells, above the upper cell or below the lower cell. There is no by-passing.

Another advantage of this type of construction is that only one restraining member in the form of a back-stop is needed to hold the cells in position, the force of gravity maintaining the cells against the back-stop.

An object of this invention is to increase the collection efficiency of an electrostatic precipitator having vertically stacked collector cells.

Another object of this invention is to simplify the construction of electrostatic precipitators having vertically stacked collector cells.

This invention will now be described with reference to the annexed drawings, of which:

Fig. 1 is a front elevation of a conventional cell on a bed plate with a portion of another cell stacked on the lower cell, and illustrates spaces through which gas to be cleaned can by-pass the collector plates;

Fig. 2 is a side elevation of an electrostatic precipitator embodying this invention, the upper and lower walls of the precipitator frame being shown in section;

Fig. 3 is a front elevation of Fig. 2;

Fig. 4 is an enlarged fractional plan view, partially in section, of the precipitator;

Fig. 5 is an enlarged fractional side elevation of the precipitator with the adjacent end walls of the collector cells removed;

Fig. 6 is an enlarged plan view of one of the clamps for clamping the ionizer to the collector cells, and Fig. 7 is an end view from the left of Fig. 6.

Referring first to Fig. 1, a collector cell 10 of the type disclosed in my said patent, is in position on a bedplate 11 of a precipitator, and has a similar cell 12 stacked upon it. The bed-plate 11 extends horizontally as is usual. The charge collector plates 14 are shorter than the grounded plates 13 for providing insulating spacing. It will be noted that gas can pass between the bed-plate and the bottom edges of the collector plates, and can pass between the two cells. Likewise gas can pass between the top cell of such a precipitator and its top wall. Such gas flow is by-pass gas and passes through the precipitator without being cleaned resulting in decreased collection efficiency.

Figs. 2–7 illustrate a precipitator embodying my invention. The frame 15 has a lower wall or bed-plate 19; has an upper wall 23, and has T-section back-stops 25. The bottom wall 19 has the horizontally extending portions 16 and 17 for attachment to a foundation, and has a vertically extending portion 18 at the inner edge of the portion 17. The wall 19 slopes downwardly from the top of the wall portion 18 to the wall portion 16.

The top wall 23 has the horizontally extending portions 20 and 21 for attachment to a support, and has a portion 22 extending vertically downwardly from the inner edge of the wall portion 20. The wall 23 slopes downwardly from the inner edge of the wall portion 21 to the lower edge of the wall portion 22 and extends parallel to the lower wall 19.

The flanged end walls 27 of the collector cells 28, 29 and 30 are diamond shaped in outline as shown by Figs. 2 and 5 as are their charge collector plates 26 and their grounded plates 31. The charge plates 26 are supported from the flanged end walls 27 by the insulators 32 and tie rods 33. The grounded plates 31 are supported from the end walls 27 by the tie rods 34. This type of plate support is that shown generally in my said patent.

The bottom edges of the flanged end walls 27 of the lowermost cell 28 rest upon the slanted bed-plate 19. The adjacent cell 29 is supported upon the cell 28 through the contact of the lower edges of its flanged end walls 27 with the upper edges of the flanged end walls 27 of the lower cell 28. The upper cell 30 is supported upon the adjacent cell 29 by the contact of the lower edges of its flanged end walls 27 with the upper edges of the flanged end walls 27 of the cell 29.

The vertically extending back sides of the flanged end plates rest against the corresponding sides of the T-sections 25 as shown by Fig. 4. Another cell could be aligned horizontally with the cell shown by Fig. 4, and would be held in position by the T-section 25 shown by Fig. 4, there being a similar T-section at the other end of each cell. Since the cells are held against the T-sections by the force of gravity, no other cell supports are required.

The ionizer for the precipitator, comprising the ionizer wires 51 and the non-discharging ionizer electrodes 50, is supported from the upper cell 30 and the lower cell 28. The vertically extending front sides 35 of the flanged end walls 27 of these cells have the slots 39 therein. The ionizer frame has a back vertically extending, outwardly turned portion 36 at each end which extend parallel to the front sides 35 of the flanged end walls 27 of the cells in contact therewith. The ionizer frame has the front vertically extending, outwardly turned portion 46 at each end. The clamping rods 40 extend through the frame portions 46 and 36 and into the slots 39. The rods 40 have the circular plates 42 attached thereto between the frame portions 46 and 36. The coiled springs 41 extend around the rods between the plates 42 and the frame portions 36 and serve to hold the clamping portions 44 of the rods which extend perpendicular thereto against the cell end wall sides 35 when the ionizer is clamped to the cells as shown by Figs. 6 and 7. The front ends of the rods 40 have the handles 47 thereon for enabling the rods to be turned. When the clamping portions 44 of the rods are turned at right angles to the position shown by Figs. 6 and 7, they line-up with the slots 39 for permitting the removal of or the installation of an ionizer.

Preferably, the sides of the cell end walls opposite the sides 35 shown by Fig. 4, would have slots 39 therein. Such slots would be at the centers of the sides 35 and the opposing sides, and the rods 40 would be lined-up with the centers of the top and bottom cells as shown by Figs. 2 and 3. With this construction less time and care will be required to assemble the precipitator since either side of a cell could be the front side.

Except for the clamping features, the ionizer is conventional, the ionizer wires 51 being attached to the metal rods 52 which are attached to the insulators 54, which, in turn, are supported by the brackets 55 from the ionizer frame.

The precipitator which is illustrated by the drawings has no side walls, the flanged end plates contacting each other and serving as the usual side walls. The ionizer frame for a vertical row of cells directs the gas to be cleaned into its associated cells. Other vertical rows of cells could be placed alongside the cells illustrated, one back-stop 25 serving to position two vertical rows of cells as is apparent from Fig. 4.

It will be apparent from Fig. 5 that no gas flowing horizontally into the precipitator can flow between the top cell and the top of the precipitator without passing between oppositely charged collector plates, and that no such gas can flow between adjacent cells without passing between oppositely charged collector plates. It will also be apparent from Fig. 2 that no such gas can flow between the bottom cell and the bottom wall of the precipitator without passing between oppositely charged collector plates. Thus, no gas by-passes the collector plates.

While the drawings show the ionizer clamped to one side of the cells, the right side facing Fig. 2 of the drawings, it could, if so desired, be clamped to the other side of the cells, requiring, of course, if this is done, that the air flow be reversed from that shown by the arrows of Fig. 5.

While one embodiment of this invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. An electrostatic precipitator comprising a plurality of collector cells having open bottoms and tops and vertically extending, substantially diamond-shaped collector plates and end walls, said cells being stacked in a vertical row, and a frame having a bottom wall sloped at an angle to the horizontal on which the lower edges of said end walls of the lowermost of said cells are supported, the lower edges of said plates of said lowermost cell extending substantially parallel to said bottom wall, said frame having a top wall extending substantially parallel to said bottom wall, the upper edges of said plates of the uppermost of said cells extending substantially parallel to said top wall.

2. An electrostatic precipitator as claimed in claim 1 in which the lower edges of the end walls of an intermediate cell are supported upon the upper edges of the end walls of an adjacent lower cell, and in which the lower edges of the plates of said intermediate cell and the upper edges of the plates of said lower cell extend parallel to said top and bottom walls.

3. An electrostatic precipitator as claimed in claim 2 in which an ionizer is provided, and means is provided for clamping the ionizer to said uppermost and lowermost cells.

4. An electrostatic precipitator as claimed in claim 1 in which an ionizer is provided, and means is provided for clamping the ionizer to said end walls of said uppermost and lowermost cells.

5. An electrostatic precipitator comprising a plurality of collector cells stacked in a vertical row, said cells having flanged end walls with vertically extending portions, an ionizer frame having ionizer wires and non-discharging ionizer electrodes supported therein, said frame having vertically extending portions, and means for clamping said vertically extending portions of said frame to said vertically extending portions of said end walls of the uppermost and lowermost of said cells.

6. An electrostatic precipitator comprising a plurality of collector cells stacked one upon another in a vertical row, said cells having open bottoms and tops and vertically extending collector plates, said plates of an upper cell having lower portions extending below horizontal lines extending through upper portions of corresponding plates of an adjacent lower cell, said cells being aligned at their inlet edges.

7. An electrostatic precipitator as claimed in claim 6 in which the cells have end walls, and in which an ionizer is provided, and means is provided for clamping the ionizer to the end walls of the uppermost and lowermost cells.

8. An electrostatic precipitator comprising a pair of collector cells having end plates, the end plates of one of said cells being in contact with the end plates of the other of said cells, said cells having open bottoms and tops and vertically extending collector plates with aligned inlet edges, said collector plates of one of said cells having downstream portions on one side of a plane extending perpendicular to said inlet edges and through upstream portions of corresponding collector plates of the other cell.

9. An electrostatic precipitator as claimed in claim 8 in which the cells have end walls, in which an ionizer is provided, and in which means is provided for clamping the ionizer to the end walls of the uppermost and lowermost cells.

References Cited in the file of this patent

UNITED STATES PATENTS 2,383,112    Dahlman    Aug. 21, 1945

FOREIGN PATENTS 464,308    Germany    Aug. 16, 1928

OTHER REFERENCES

Westinghouse, "Precipitron" Electrostatic Air Cleaner Design and Installation Procedure Bulletin, 3M-9-39, page 4. 1941.